Sept. 7, 1954

W. H. POPP 2,688,149

CASTER

Filed July 15, 1950

INVENTOR.
Walter H. Popp.

Patented Sept. 7, 1954

2,688,149

UNITED STATES PATENT OFFICE 2,688,149

CASTER

Walter H. Popp, Buffalo, N. Y.

Application July 15, 1950, Serial No. 174,070

4 Claims. (Cl. 16—18)

This invention relates to a caster, and the principal objects of the invention are to provide a caster which is so constructed as to inherently dampen out shimmy vibrations, and which takes maximum advantage of this anti-shimmy feature by being so constructed as to swing about its vertical axis with minimum frictional resistance.

Other collateral features of the invention and practical solutions thereof are described in detail in the specification, and are illustrated in the accompanying drawings, wherein.

Similar characteristics indicate like parts in both figures of the drawing.

Figures 1, 2:
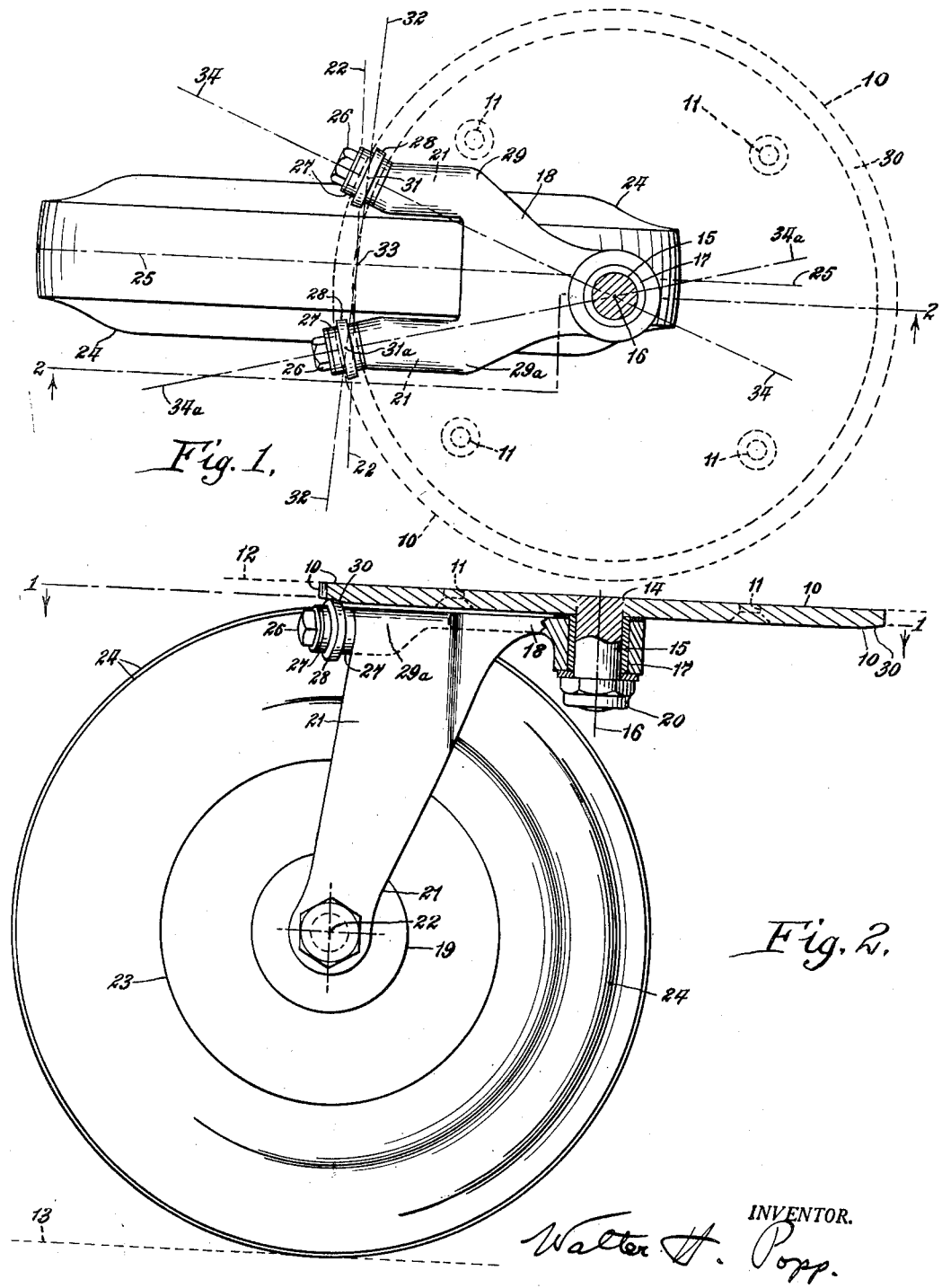
Fig. 1 is a horizontal section through one form of the caster, looking down, taken on line 1—1, Fig. 2.
Fig. 2 is a vertical, longitudinal section through said caster, taken on line 2—2, Fig. 1.

The fastening or supporting plate 10 of the caster is of circular shape and is provided with a plurality of vertical fastening holes 11 which are suitably countersunk at their lower ends so as to receive suitable flat head screws or bolts (not shown), whereby said supporting plate may be secured to the lower horizontal face of the hand truck or other movable body 12 which is to be rollingly supported by casters upon the surface 13. Welded at 14 to said circular supporting plate 10 is a depending spindle 15 which is positioned coaxially with respect to said circular supporting plate 10, the axis of both said spindle and said supporting plate being denoted by the numeral 16.

Journaled on a bushing 17 on said spindle 15 is a rearwardly and downwardly extending fork or swing arm 18, which is held up in place by an "elastic" nut 20. In an ordinary caster, the whole load is carried at this point, and the friction resulting from this fact, in combination with the type of bearing employed (frequently supplemented by friction washers, shimmy dampeners, etc.), is relied upon to dampen shimmy vibrations. In the present invention, the load carried at this point and hence the friction is substantially zero, shimmy vibrations being taken care of at their source. Hence, in the present invention the fork or swing arm 18 may, if desired, be mounted on the spindle 15 on anti-friction bearings, such as ball or needle bearings, but the cost of the same is not deemed worth while in view of the fact that the load carried at this point by the present invention is substantially zero.

The downwardly extending arms 21 of the swing arm 18 are journaled at their lower or distal ends, on axis 22, to the hub 19 of the wheel 23 upon which is mounted the tire 24. It is to be particularly noted that these arms 21 are both offset with respect to the swivelling axis 16, and, as a consequence, a plane 25 passing medially through the tire 24 is offset from the spindle axis or axis of swivelling 16, as seen in Fig. 1. This offset, it has been found, inherently dampens out shimmy vibrations, without requiring the employment of friction or shimmy dampeners to effect this result. When the medial plane 25 is not offset (as in an ordinary caster), the swinging back and forth of the swing arm 18 is of a sinusoidal character, and hence any resistance to shimmy is inconsequential in amount until the swing arm has moved a considerable distance to one side or other of dead center. In the present invention, there is at all times a considerable resistance to lateral movement of the swing arm 18, irrespective of what position it happens to be in. This results from the fact that the medial plane 25 of the tire 24 always tends to track, and even on a quite slippery surface does definitely track along its medial plane 25, whereas the forces which are doing the pulling along of the swing arm and wheel all flow from the axis 16 which is offset relatively to said plane 25. The result is that any lateral movement of the tire 24 is resisted at all times by a considerable amount of frictional force between the tire and the supporting surface 13 as soon as any lateral movement of the tire commences. This is quite a different thing from absorbing shimmy vibrations in the swing arm itself by friction, or by the use of shimmy dampeners connected with said swing arm.

It is deemed to be obvious that, if two or more wheels and tires are used in a single caster, the term "medial plane" is to be understood as that plane which is symmetrical with respect to said wheels and tires taken as a group.

The upper, rear part of the swing arm 18 is preferably bifurcated at 29 and 29a, as shown in Fig. 1, so as to straddle the adjacent tread of the tire. These two upper, rear ends 29, 29a of said swing arm are provided with cap screws 26 upon which are journaled, on axes 34 and 34a, the hubs 27 of a pair of tapered rollers 28. The tapered peripheries of these rollers engage the beveled surface 30 which is annularly formed adjacent the periphery of the circular fastening plate 10. The medial points of the peripheries of the rollers 28 touch the tapered surface 30 at points 31 and 31a, and a vertical plane passing through these two points has been denoted by the numeral 32. It will be noted that this plane 32 intersects the medial plane 25 of the tire in the same vertical line 33 as is intersected by a vertical plane passing through wheel axis 22. Hence, in theory at least, all vertical pressures imposed upwardly on the tire 24 are carried through the rollers 28 directly to the fastening plate 10, and no great force is carried through the spindle 15. The chief function of this spindle is to guide the swing arm 18 horizontally, as its rollers 28 run around on the beveled surface 30 of the circular supporting plate 10. This spindle 15 also serves to support the swing arm 18 and its tire 24, etc. whenever the movable body 12 is lifted bodily into the air.

It is to be noted that all vertical pressures which emanate from the tire 24 flow directly up through the arms 21 of the swing arm 18, cap screws 26 and rollers 28 to the supporting plate 10, with practically no vertical pressures going through the spindle 15. For this reason the swing arm 18 need not be heavily constructed, as is required in the case of an ordinary caster.

It is to be understood that this invention is not confined to the particular caster here disclosed, but includes everything within the properly interpreted scope of the following claims.

I claim:

1. A caster comprising: a supporting plate adapted to be attached to a movable body; a swing arm swivelled to said supporting plate; and wheel means journaled on the distal end of said swing arm with the axis of rotation behind the axis of swivelling of said swing arm, and the medial plane of the wheel means being offset with respect to said axis of swivelling.

2. A caster comprising: a supporting member adapted to be attached to a movable body; a swing arm swivelled to said supporting member; and wheel means journaled on said swing arm with the axis of rotation behind the axis of swivelling of said swing arm, and the medial plane of the wheel means being offset with respect to said axis of swivelling.

3. As in claim 1 with the further limitation that the caster be unsymmetrical with respect to both a plane in which the axis of swivelling of the swing arm lies and which intersects the journal axis for the wheel means at right angles thereto, and also with respect to a plane in which said axis of swivelling of the swing arm lies and which extends parallel to said journal axis for the wheel means.

4. As in claim 2 with the further limitation that the caster be unsymmetrical with respect to both a plane in which the axis of swivelling of the swing arm lies and which intersects the journal axis for the wheel means at right angles thereto, and also with respect to a plane in which said axis of swivelling of the swing arm lies and which extends parallel to said journal axis for the wheel means.

References Cited in the file of this patent

UNITED STATES PATENTS

| Number | Name | Date |
|--------|------|------|
| 126,433 | Arnold et al. | May 7, 1872 |
| 246,520 | Lamb | Aug. 30, 1881 |
| 270,605 | Paepke | Jan. 16, 1883 |

FOREIGN PATENTS

| Number | Country | Date |
|--------|---------|------|
| 114,917 | Great Britain | Apr. 25, 1918 |